United States Patent [19]

Manders

[11] 4,304,663

[45] Dec. 8, 1981

[54] OIL FILTER APPARATUS

[76] Inventor: Logan J. Manders, P.O. Box 284, Delmar, Del. 19940

[21] Appl. No.: 225,597

[22] Filed: Jan. 19, 1981

[51] Int. Cl.³ .......................................... B01D 27/10
[52] U.S. Cl. .................. 210/90; 210/130; 210/136; 210/168; 210/180
[58] Field of Search .................. 210/90, 91, 130, 136, 210/168, 180, 436, 440; 196/46.1

[56] References Cited

U.S. PATENT DOCUMENTS

| | | | |
|---|---|---|---|
| 2,536,663 | 1/1951 | Schaer | 210/130 |
| 2,776,056 | 1/1957 | Douglas | 210/90 |
| 3,425,511 | 2/1969 | Severin | 210/130 |
| 3,474,906 | 10/1969 | Tennis | 210/90 |
| 3,644,915 | 2/1972 | McBurnett | 210/90 |
| 4,189,351 | 2/1980 | Engel | 210/446 |
| 4,205,703 | 6/1980 | Silverwater | 210/90 |
| 4,246,109 | 1/1981 | Manders | 210/90 |

*Primary Examiner*—Ernest G. Therkorn
*Attorney, Agent, or Firm*—John J. Byrne; Bradford E. Kile

[57] ABSTRACT

An electronic oil filter apparatus comprising an oil filter (20) and a bypass valve (22). Pressure build up within the filter (20) caused by clogging of the filter results in opening the bypass valve (22) allowing dirty oil to flow around the filter. When the valve is actuated in response to excess pressure build up, a low voltage switching device allows current to flow to a signal means (74) thereby indicating a need to change the filter.

6 Claims, 8 Drawing Figures

OIL FILTER APPARATUS

BACKGROUND OF THE INVENTION

This invention relates to a novel oil filter apparatus. More particularly the invention comprises a combination of an electronic apparatus for monitoring and signaling the condition of an oil filter operable to remove solid contaminates and water or other volatile contaminates from engine lubricating oils.

Internal combustion engines, and the like, having a large number of relative moving parts are continuously lubricated by an associated lubrication system. The lubrication system typically includes an oil sump from which oil is pumped in a fluidic loop or splashed around and over moving engine parts such as valves, piston rods, etc. In order to eliminate abrasives which become suspended within the lubrication system the oil is continuously pumped through an oil filter mounted in series with the oil loop. In addition to abrasives however, water and other entrained liquid contmainates should be removed to prevent "sludge" buildup. If both solid and liquid contaminates can be reliably removed it becomes unnecessary to change the oil since the oil per se does not "wear out" but rather becomes contaminated with solid and liquid impurities.

It is critical to maintain lubricating oils clean when lubricating expensive machinery such as internal combustion machines. The prior art teaches many variations in replaceable filters for such purposes. It is difficult for the operator of machinery, however, to determine when a filter must be replaced. Therefore, manufacturers of such equipment typically recommend that filters should be replaced after "so many hours of operation" or "after so many miles traveled". These methods are imprecise and often lead to the retention of filters past their useful life with subsequent damages to an engine or the filters are replaced unnecessarily before replacement is required. As more expensive and sophisticated filtering equipment is utilized an incentive exists to extend the useful life of the filter while concomitantly accurately determining when a filter needs replacement.

One method for increasing the useful life of filters is to insure that the oil to be cleaned is heated to a sufficient degree to evaporate entrained liquid impurities such as water. In this connection water combines with other impurities to form sludge which leads to an early clogging of a filter media. Although such heating apparatus is relatively expensive it does not provide an operator with a means for determining the effectiveness of the heating means in extending the life of the filter. One example of a heating device used in association with an oil filter is shown in an Engel U.S. Pat. No. 4,189,351, issued Feb. 19, 1980.

Other workers in the field have developed means for sensing the degree of resistance filtered oil encounters via its travel through a filter by sensing the difference in oil pressure between an inlet and outlet and, upon sensing a predetermined difference, activating an alarm for signalling the operator that the filter is clogged.

At least one previously known system is designed to signal actuation of an engine mounted bypass valve. In this regard the valve structure is placed in series with an engine battery and in parallel with an alarm. In the event the bypass valve and circuit are opened the battery will conduct through the alarm thus signalling opening of the bypass valve.

While such a system provides at least a degree of theoretical appeal one disadvantage is that alarm systems of this type require special fitting within an oil system. Additionally a potential for sparking exists within the oil system when the bypass electrical circuit is broken. Still further such bypass valves are subject to "chatter" during starting, etc. due to temporary high loads.

One system which advantageously obviates many of the disadvantaes of previously known bypass systems is disclosed and claimed in my copending U.S. application Ser. No. 77,832, filed Sept. 21, 1979 and now U.S. Pat. No. 4,246,109. The disclosure of this patent is hereby incorporated by reference as though set forth at length.

A difficulty with my prior disclosed bypass system is that the bypass structure tends to be relatively expensive when compared with many filter canisters. Moreover the inferior character of most filtering media and systrems dictates relatively rapid replacement.

The difficulties suggested in the preceding are not intended to be exhaustive, but rather are among many which may tend to reduce the effectiveness of prior oil filter methods and apparatus. Other noteworthy problems may also exist; however, those presented above should be sufficient to demonstrate that oil filter methods and apparatus appearing in the past will admit to worthwhile improvement.

OBJECTS OF THE INVENTION

It is, therefore, a general object of the invention to provide a novel oil filter apparatus which will obviate or minimize difficulties of the type previously described.

It is a primary object of the invention to provide a synergistic combination of a filtering system which will enhance the useful life of a given quantity of oil by eliminating both liquid and solid impurities and concomitantly accurately indicate when an oil filter medium should be replaced.

It is another object of the invention to provide a novel oil filter system wherein a clogged condition of a filter medium will be reliably indicated while temporary surges in oil pressure due to cold start up and the like are not reported.

It is a further object of the invention to provide a novel oil filter apparatus wherein an electrical signal will be generated upon opening of a bypass valve within an oil filter system while minimizing the possibility of creating a spark within the lubrication system.

It is yet a further object of the invention to provide a novel oil filter apparatus which will signal a clogged oil filter condition by breaking an extremely low voltage connection.

It is yet another object of the invention to provide a novel oil filter apparatus which will accurately and reliably signal the opening of an oil bypass valve.

It is a further object of the invention to provide a novel oil filter apparatus which would be commercially feasible to install on standard vehicles.

It is another particular object of the invention to provide a novel oil filter apparatus which may be facilely mounted upon a conventional engine to advantageously utilize a conventional oil canister.

It is still a further object of the invention to provide a novel oil filter system which is both economical to operate in that the oil per se does not have to be replaced while being highly reliable in preventing engine wear attributable to abrasives and sludge in the oil system.

BRIEF SUMMARY OF THE INVENTION

A preferred oil filter apparatus intended to achieve at least some of the foregoing objects comprises an oil filter canister with a porous media to remove solid contaminates and an evaporation plate and vent to remove volatile contaminates. An oil bypass valve is mounted in the oil system adjacent the canister and serves to accurately monitor the condition of the filter media. When a clogged filter is detected a signal is actuated and oil is temporarily routed past the filter until the filter can be replaced. The bypass valve is so constructed such that only a clogged condition is sensed and temporary pressure surges do not trigger the system.

The bypass valve is electrically connected between a common ground and a base of a transistor switching circuit. The transistor switch is biased to pass current to a signal when the low voltage of the base to common ground is interrupted. Accordingly a signal is actuated when the bypass valve opens without creating a potential for arcing within the lubrication system.

With the subject system it is possible to reliably maintain an engine's lubricating oil in a clean and serviceable condition without changing the oil; just the filter.

THE DRAWINGS

Other objects and advantages of the subject invention will become apparent from the following detailed description of preferred embodiments thereof taken in conjunction with the accompanying drawings, wherein.

DETAILED DESCRIPTION

Figure 1:
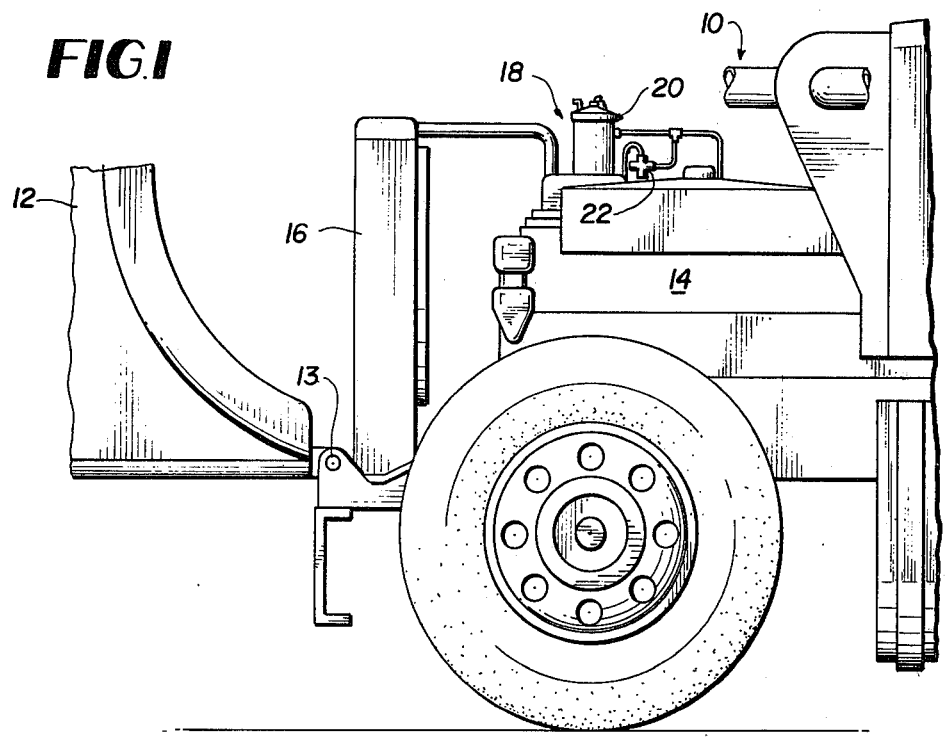
FIG. 1 is a side view of an oil filter canister and bypass valve arrangement mounted on a tractor according to a preferred embodiment of the invention.

Referring now to the drawings, wherein like numerals indicate like parts, and particularly to FIG. 1, thereof there will be seen an oil filter system in accordance with a preferred embodiment of the invention. More specifically a forward segment of a tractor 10 is disclosed in FIG. 1 wherein a cab 12 is shown in a service position tilted forward about axis 13. The tractor includes a conventional engine block 14, radiator 16 etc. An oil filter assembly 18, in accordance with a preferred embodiment of the invention, is connected to the block and includes an oil filter 20 and an associated bypass and indicator valve 22 assembly connected in the engine lubrication system of the tractor.

Figure 2:
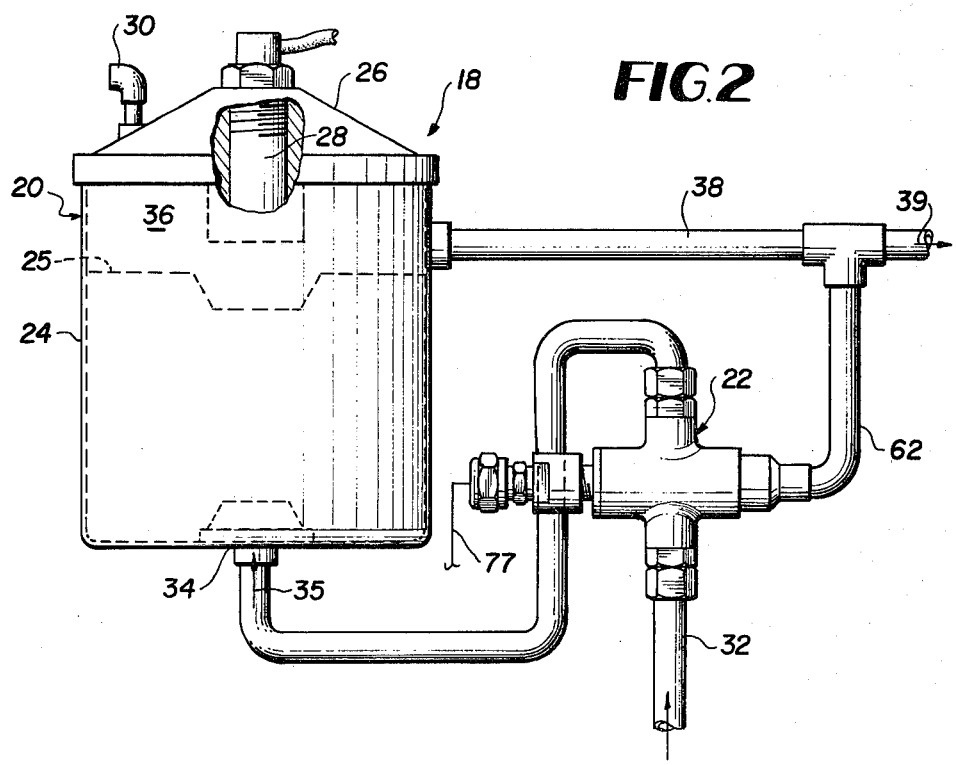
FIG. 2 is a side detail view, partially broken away and discloses an oil canister filter construction and bypass valve in accordance with the invention.

Referring now to FIG. 2 there will be seen a more detailed side view of the subject invention wherein the oil filter 20 includes a generally cylindrical housing or canister 24 which is operable to receive a conventional solid cylindrical filter media 25. The filter media releasably slides into the housing 24 and may be facilely replaced when desired. The top of the canister 24 is covered with an evaporator plate 26. The evaporator plate includes an electrical resistance heating element 28 which serves to vaporize volatile contaminants within an engine's lubricating oil such as water. The vaporized contaminants are vented to the atmosphere through an open vent 30 in the evaporator plate 26.

As previously indicated one form of an oil filter operable for use with the subject invention is disclosed in a Engel U.S. Pat. No. 4,189,351. The disclosure of this Engel patent is hereby incorporated by reference as though set forth at length.

The flow of oil through the oil filter 20 is provided by an inlet line 32 which passes through the bypass valve 22 in accordance with the invention and enters the filter housing 24 at the base thereof, as indicated at 34 by directional arrow 35. From the inlet oil then flows upwardly through the porous filter media into an upper chamber 36 where volatile contaminants within the oil are heated and vented to the atmosphere. The cleansed oil is then returned to the engine block through return line 38; as indicated by directional arrow 39.

Figure 3:
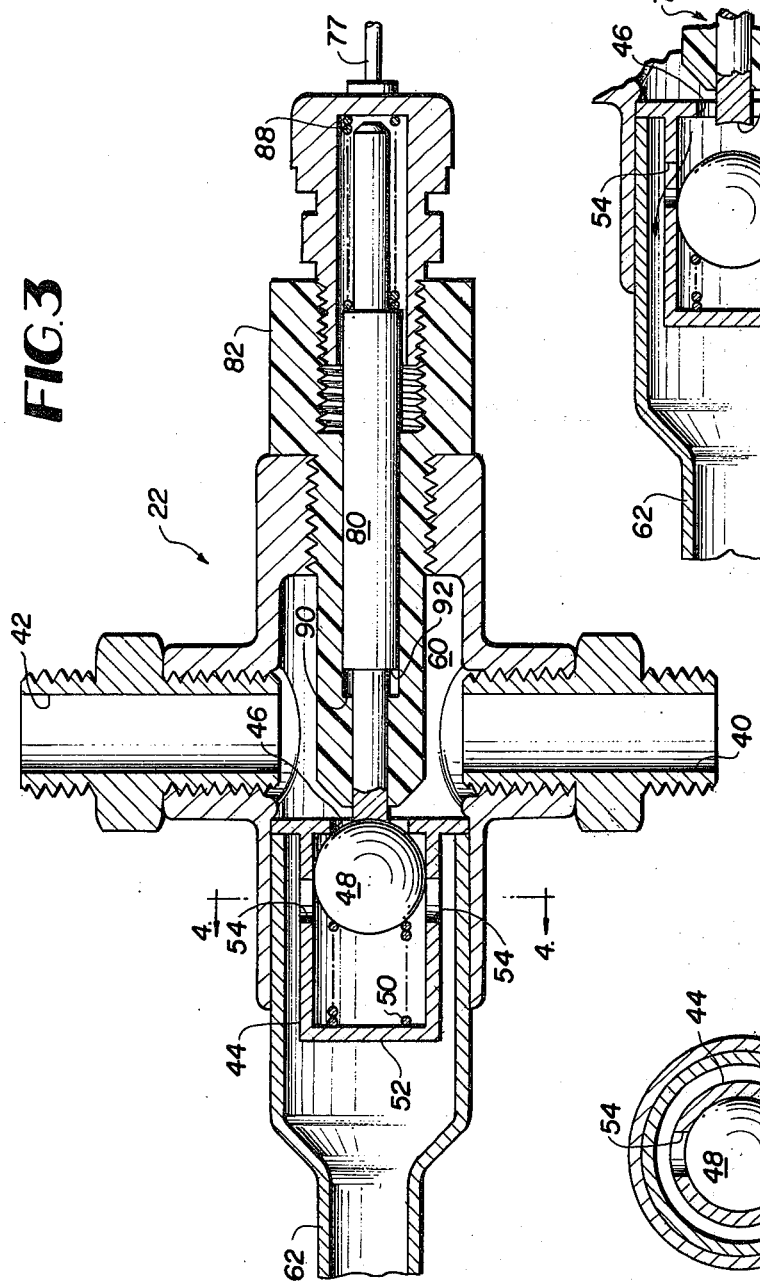
FIG. 3 is a cross-sectional view and discloses a novel valve switch arrangement in accordance with the invention.

As mentioned above a bypass valve 22 is connected into the oil inlet line 32 and as specifically disclosed in FIG. 3 the bypass valve includes an inlet coupling 40 and an outlet coupling 42. Accordingly under normal circumstances engine lubricating oil will pass directly through the bypass valve 22 into the oil filter 20 and back to the tractor engine block 14.

In the event the filter media 25 becomes clogged and impacted with solid finds, filtered from the oil, the filter will build up a back pressure thus raising the pressure within the bypass valve 22 relative to the pressure within the oil return 39. The bypass valve 22 includes a cylindrical internal sleeve 44. A valve seat 46 is mounted at the base of the sleeve 44 and is configured to sealingly engage a valve body 48.

Figure 5:
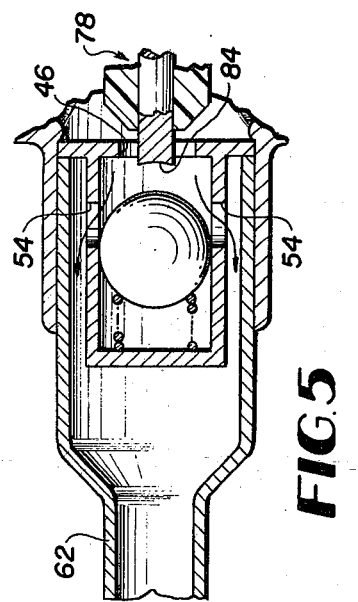
FIG. 5 is a detailed side view of the flow of oil around a check valve arrangement in accordance with a preferred embodiment of the invention.
Figure 4:
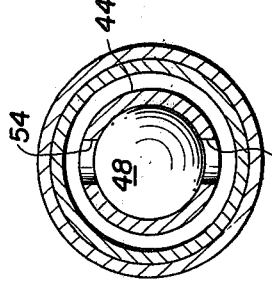
FIG. 4 is a cross-sectional view taken along section line 4—4 in FIG. 3.

The valve body 48 depicted in FIGS. 3-5 comprises in a preferred embodiment at a metallic sphere. Other valve shapes, however, may be used such as cones, cylinders and the like as desired.

The valve body 48 is normally biased against the valve seat 46 by a compression spring 50 which reacts against an end cap positioned across the valve casing 44.

A plurality of fluid ports 54, note particularly FIG. 4, extend radially through the sleeve 44 and are located in an axial posture downstream from the valve body seat 46.

In the event pressure within the interior of the bypass valve 22 as at 60 builds up beyond a predetermined acceptable pressure the lubricating oil will push the valve body 48 off of the seat 46 and slide the valve along sleeve 44 until the radial ports 54 are uncovered. Once the ports 54 are uncovered oil will flow through the bypass valve and back into the lubrication system without being filtered through bypass conduit 62, note particularly FIGS. 2 and 5.

In order to warn an operator of the actuation of bypass valve 22 an indicator assembly is connected to the bypass valve which will appraise the operator of a need to change the oil filter media.

Figure 6:
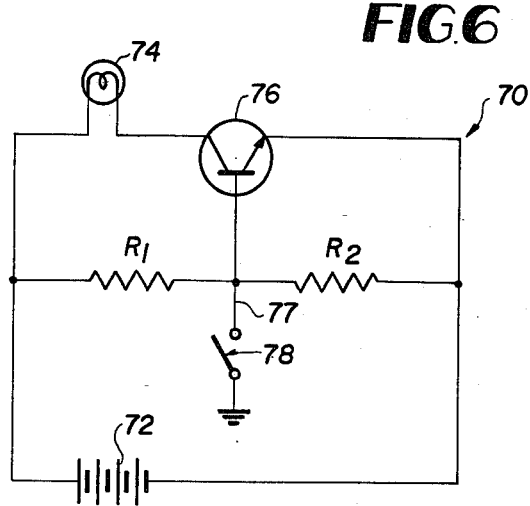
FIG. 6 is an electrical diagram of the invention wherein a common base transistor circuit enables actuation of a signal lamp upon breaking a low voltage connection to ground.

In this connection an electronic circuit 70, note FIG. 6, is provided which includes a source of voltage potential 72, such as a battery, a signal 74, such as a lamp, buzzer or other warning indicia, and a transistor switch 76.

The transistor switch preferably comprises an NPN common ground circuit wherein the lamp 74 is in series with a resistor R1 in the base/collector circuit and a second resistor R2 is in the base emittor circuit. The base is connected to a common ground such as the tractor engine chassis through a conduit 77 and a switch 78.

The switch 78 physically comprises an axially extending contact shaft 80 which is coaxially mounted within the bypass valve 22, note FIG. 3, within a dielectric sleeve 82. A distal end surface 84 of the shaft 80 normally abutts against and establishes an electrical contact with the metallic valve body 48. The shaft 80 is biased from right to left as viewed in FIG. 3 by a compression spring 88 having a normal spring force less than compression spring 50 such that the contact shaft 80 will be biased into engagement with valve 48 but without releasing the valve from its seat under normal operating conditions.

An internal shoulder 90 is fashioned within the dielectric sleeve 82 which cooperates with an external shoulder 92 on the axial shaft 80. Accordingly the contact 80 operably rides against the valve 48 for a degree of axial travel until sufficient pressure is built up within the bypass valve to firmly release the valve and cause system oil to bypass the filter media. This lost motion or degree of free travel eliminates valve chatter and signally of a clogged valve during temporary or intermittent increases in system pressure.

Returning to FIG. 6 the resistances R1 and R2 are chosen in combination with the base/common ground connection to reverse bias the transistor 76. When the base to ground contact is broken by travel of the valve body away from the contact shaft 80 the transistor 76 is forward biased and permits current to pass which actuates the signal 74 indicating the fact that oil is bypassing the filter 18 and that a new filter is required.

When a new filter is required the evaporator cap 26 on the filter housing 24 is removed, by reversing releasable connection assemblies between the evaporator cap and the housing 24, and the filter media is withdrawn and replaced by a clean filter.

Figure 7:
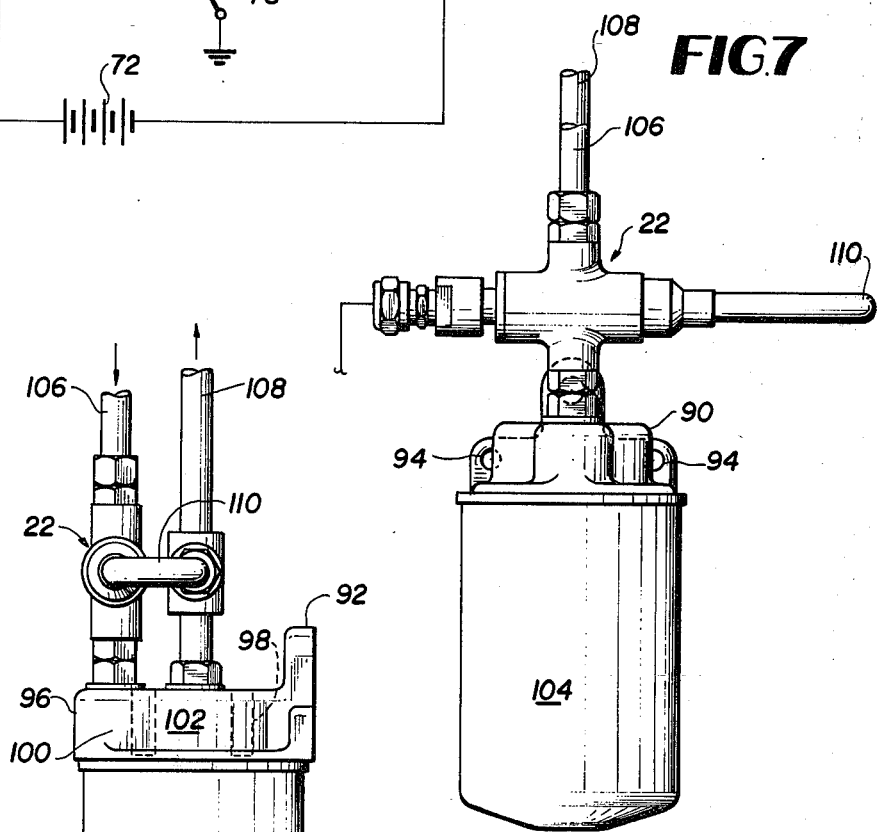
FIG. 7 is a front view of an alternate embodiment of the invention wherein a bypass valve is mounted upon an adapter for a conventional canister type oil filter.
Figure 8:
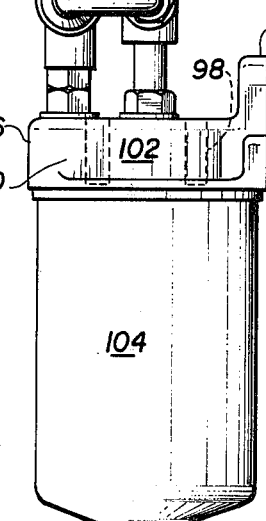
FIG. 8 is a side view of the adapter disclosed in FIG. 7.

Referring now to FIGS. 7 and 8 there will be seen an alternate preferred embodiment of the invention wherein an adapter unit 90 includes a first upstanding flange 92 having a plurality of aperatures 94 fashioned therethrough and being operable to mount the adapter upon an engine block, frame member or the like of an internal combustion engine.

The adapter 90 further includes a head plate 96 having an internal peripheral wall 98 which serves to divide the adapter head into an outer peripheral inlet chamber 100 and an inner cylindrical outlet chamber 102. The adapter is further provided with a central threaded fitting, not shown, of a conventional design operable to securely couple a conventional cylindrical oil filter 104 to the adapter.

Under normal operating conditions oil from the engine block will flow from conduit 106 through an oil bypass valve 22, as previously described, and into the annular chamber 100. From this chamber oil will flow around a hollow cylindrical filter media, through the media and back to the engine via return conduit 108. In the event the cylindrical filter media becomes clogged, oil will bypass the filter via U-shaped conduit 110 and return directly to the outlet 108. This bypass condition is then signaled to an operator via opening of the bypass valve 22 as previously discussed in connection with FIGS. 2-6.

In describing an oil filter system in accordance with preferred embodiments of the invention those skilled in the art will recognize several advantages which singularly distinguish the subject combination from previously known systems.

As particular advantage is the provision of a system which can be reliably utilized to maintain an oil lubrication system in a clean condition thus eliminating the need to change the oil. In this connection volatile contaminants such as water and the like are removed from the lubrication system by an oil filter having an evaporation head while solid impurities are concomitantly filtered from the system via a cylindrical filter media. Although such a system is somewhat expensive with respect to throw away filter designs the overall system is economic in that a bypass valve to the filter media is provided which is operable to reliably signal the existence of a clogged filter to an operator. Since the timing for filter replacement can be accurately determined with the subject system expensive filters can be utilized to the maximum extent of their operating capacity while fully protecting the engine from solid abrasion contaminants.

Another significant feature of the instant invention is the provision of a lost motion valve assembly wherein temporary increases in lubrication pressure will not signal a defective filter condition.

It is another aspect of the instant invention to provide a signalling system whereby breaking a milli or microvolt potential between a transistor base and common ground is achieved when the bypass valve is open. Such low potential significantly reduces the possibility of any arcing at the switch contact point during operation of the bypass valve.

Yet another aspect of the subject invention is the provision of an adapter system which may be facilely mounted upon an engine block and operably connected to a lubrication system wherein conventional cylindrical oil canisters may be utilized.

In describing the invention, reference has been made to preferred embodiments. Those skilled in the art however, and familiar with the disclosure of the subject invention, may recognize additions, deletions, modifications, substitutions and/or other changes which will fall within the purview of the invention as defined in the following claims.

I claim:
1. An oil filter system comprising:
   a housing,
   an oil filter mounted within said housing having an oil inlet permitting oil to enter said oil filter on one side thereof and an oil outlet permitting oil to flow out of a second side of said filter wherein oil from a lubricating system can be pumped through said oil filter for filtering solid impurities entrained within the oil system;
   heating means for heating oil within said housing to a temperature sufficient to evaporate volatile impurities entrained within the oil system;

venting means for exhausting the volatile impurities so evaporated, a normally closed check valve having an upstream side in communication with said oil inlet and a downstream side in communication with said oil outlet, first means communicating said oil inlet to said oil outlet by opening said check valve means upon sensing a clogged filter producing a predetermined pressure buildup within the bypass valve;

second means detecting when said oil bypass has occurred, warning signal means; and third means activating said warning signal means when said oil filter bypass occurs.

2. An oil filter system as defined in claim 1 wherein said check valve comprises:

a hollow cylindrical valve guide, a valve seat positioned at one end of said valve guide, a valve body dimensioned to intimately slide within said valve guide, a spring for biasing said valve body against said valve seat, and porting means extending through said valve guide downstream of said valve seat for permitting oil to flow through said check valve when said valve body moves away from said valve seat in response to said sensing of a predetermined difference by said first means.

3. An oil filter system as defined in claim 1 wherein said third means comprises:

an electrical circuit connected to said oil bypass means for signaling the existence of a clogged oil filter and the flow of oil through said oil bypass means, said electrical circuit comprising, a transistor switch operably connected to a switch including a common ground transistor wherein the base of said transistor is connected to a ground potential through said check valve means;

fourth means connecting to said transistor switch to said warning signal; and contact means connected to said check valve for actuating said transistor switch and said signal means in response to opening of said check valve means.

4. An oil filter system as defined in claim 3 wherein said contact means comprises:

contact means extending within a dielectric isolation member on said check valve means and being biased into electrical contact with the upstream side of said valve, said contact means being dimensioned for partial travel when said valve body is positioned on said valve seat and said contact means operable to be extended to a position at which the valve body begins to permit oil to pass through said radial port means wherein electrical contact between said valve body and said contact means will be broken approximately when oil begins to flow through said radial port means.

5. An oil filter system comprising:

an adapter member operable to be mounted upon an engine for receiving an oil filter canister;

said adapter having a head plate with a peripheral wall dividing said head plate into an outer peripheral oil inlet chamber and an inner oil outlet chamber;

oil inlet conduit means for delivering oil to be filtered to said inlet chamber;

oil outlet conduit means for receiving return oil from said outlet chamber;

a normally closed means having an upstream side in communication with said oil inlet conduit and a downstream side in communication with said oil outlet conduit, said normally closed bypass means including,
a hollow cylindrical valve guide,
a valve seat positioned at one end of said valve guide,
a valve body dimensioned to intimately slide within said valve guide,
a spring for biasing said valve body against said valve seat, and
porting means extending through said valve guide downstream of said valve seat for permitting oil to flow through said bypass means when said valve body moves away from said valve seat in response to a predetermined buildup of oil pressure within said check valve;

means communicating said oil inlet conduit to said oil outlet by opening said bypass means upon sensing a clogged filter producing a predetermined pressure buildup within the bypass valve;

warning signal means; and an electrical circuit connected to said oil bypass means for signaling the existence of a clogged oil filter and the flow of oil through said oil bypass means, said electrical circuit comprising, a transistor switch operably connected to a source of electrical potential, and contact means connected to said valve body for actuating said transistor switch and said signal means in response to opening of said valve means.

6. An oil filter system as defined in claim 5 wherein said contact means comprises:

contact means extending within a dielectric isolation memer on said bypass means and being biased into electrical contact with the upstream side of said valve body, said contact means being dimensioned for partial travel when said valve body is positioned on said valve seat and said contact means operable to be extended to a position adjacent to but short of the axial position at which the valve body begins to permit oil to pass through said radial port means wherein electrical contact between said valve body and said contact means will be broken approximately when oil begins to flow through said port means.

* * * * *